US006665822B1

(12) United States Patent
Conway

(10) Patent No.: US 6,665,822 B1
(45) Date of Patent: Dec. 16, 2003

(54) FIELD AVAILABILITY MONITORING

(75) Inventor: Adam Michael Conway, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 506 days.

(21) Appl. No.: 09/591,154

(22) Filed: Jun. 9, 2000

(51) Int. Cl.[7] ................................................. G06F 11/00
(52) U.S. Cl. ............................................. 714/47; 714/4
(58) Field of Search ............................. 370/245; 714/4, 714/43, 47

(56) References Cited

U.S. PATENT DOCUMENTS

| | | | | |
|---|---|---|---|---|
| 3,928,830 A | * | 12/1975 | Bellamy et al. ............... 256/22 |
| 4,881,230 A | * | 11/1989 | Clark et al. ................... 714/712 |
| 5,838,683 A | | 11/1998 | Corley et al. ................. 370/408 |
| 5,864,542 A | | 1/1999 | Gupta et al. .................. 370/257 |
| 5,867,666 A | | 2/1999 | Harvey .................... 395/200.68 |
| 6,205,565 B1 | * | 3/2001 | Bissett et al. ................... 714/49 |
| 6,237,114 B1 | * | 5/2001 | Wookey et al. ................ 714/47 |
| 6,430,711 B1 | * | 8/2002 | Sekizawa ...................... 714/47 |
| 6,449,739 B1 | * | 9/2002 | Landan ......................... 714/47 |

* cited by examiner

Primary Examiner—Robert Beausoliel
Assistant Examiner—Emerson Puente
(74) Attorney, Agent, or Firm—Law Offices of Imam

(57) ABSTRACT

An networking system is disclosed in accordance with an embodiment of the present invention to include a field availability monitoring system (FAMS) for receiving problems associated with one or more field replaceable units (FRUs), qualifying the problem and transmitting the problem for tracking thereof so as to improve the quality of components used in the FRUs.

11 Claims, 8 Drawing Sheets

FIELD AVAILABILITY MONITORING

BACKGROUND OF THE INVENTION

1. Field of the Invention

The present invention relates generally to a method and system for tracking failures or problems related to network systems after manufacturing and shipment of the network systems to users of the same and particularly to categorizing the failures associated with the network systems after their shipment for performing failure analysis to improve the quality of the network systems manufactured n the future.

2. Description of the Prior Art

Popularity of tie integration of voice and data information carried over packet switching networks, such as the Internet, has resulted in the development of complex network equipment including multiple routers, servers, switches and the like. Cisco Systems, Inc. of San Jose, Calif. has integrated multiple network functions, such as servers and routers into a single device for use in various locations within packet switching network environments.

Perceptually, one of the problems with network systems in the world of telephony, experienced by users of such systems, is lack of reliability of the components included therein. Poor availability is perceived as a 'black eye' in the world of networking. Moreover, as networking systems become more complex and include additional moving parts, such as fans for cooling the increasing population of electronic components within the system, system reliability becomes even greater of a problem. In order to meet the level of reliability expected by users of the system, there needs to be a method for tracking problems and/or failures encountered by individual components incorporated within the system after the system becomes operational in the field and for categorizing the tracked problems so as to improve the quality of system by perhaps avoiding use of highly problematic components used therein.

Additionally, there is currently little information available as to the cause of failures thereby preventing any improvements to be made to systems manufactured in the future that are likely to experience the same type of failures.

It is nearly impossible to create a truly reliable system of any complexity in the first attempt at developing such a system. As known to those skilled in the art, there is always going to be cause(s) for failures not necessarily considered during the initial design of the system. In order to achieve the intended availability and reliability, the design needs to be continually refined. Thus, a method and apparatus is needed for monitoring the availability of products after shipment of the same to users thereof.

Currently, the only known way of becoming aware of problems is when users of a system complain of their experienced failure(s) or if the rate of return of defective systems caused by malfunctioning components incorporated therein increases. Thus, only failures that are highly visible are likely to be given attention and ultimately fixed in future designs. Problems or failures that occur early in the life of the system that may be random yet common in nature are often missed.

Thus, the need arises for a system and method for tracking problems experienced by network systems and for transferring the tracked information to a location to be analyzed for assistance in eliminating problems in the future and for maintaining an actual lifetime measurement for the components incorporated within the network system so as to improve the quality thereof.

SUMMARY OF THE INVENTION

Briefly, a networking system is disclosed in accordance with an embodiment of the present invention to include a field availability monitoring system (FAMS) for receiving problems associated with one or more field replaceable units (FRUs), qualifying the problem and transmitting the problem for tracking thereof so as to improve the quality of components used in the FRUs.

The foregoing and other objects, features and advantages of the present invention will be apparent from the following detailed description of the preferred embodiments which make reference to several figures of the drawing.

IN THE DRAWINGS

DETAILED DESCRIPTION OF THE PREFERRED EMBODIMENTS

Definitions

A short glossary of terms, as used herein, is presented below:

Availability
    A statistical probability that at any given point in time, a particular system is functioning properly. When a system is characterized as having a high availability, the system is known to function properly almost all of the time. This value is measured in percentage and calculated as follows: Operational time divided by total time. For a hardware system or component, this can be predicted to be MTBF/(MTBF+MTTR). This cannot be objectively predicted for software modules.

SSP
    System Switch Processor or Back Plane Switch

FMM
    Fault Management Module. This is the module that reports all failures and status from the cards in the unit to the system management software.

FRU
  Field Replaceable Unit. The smallest saleable unit into which a system is divided.
MTBF
  Mean Time Between Failures. A measure of hardware reliability that gives the mean time between failures. This measure is used for field replaceable units (FRUs).
MTTR
  Mean Time To Repair. A measure of the mean time it takes to repair a product.
System Manager Software
  This is the system management software that typically resides on the server. This is the module that actually contains the Availability Monitoring code.
Reliability
  Reliability is the probability of survival (or no failure) for a stated length of time. This measure deals only with failures that cause downtime (inoperation) and is measured in time. For example, MTBF is an example of a specific measure of reliability.
Server
  A server is a general processing unit that can perform specific tasks in software. The operating system code, such as Microsoft Windows NT or any other type of operating system code, and the call processing software are typically stored in the server. The server is considered a FRU, which includes the hard drive.

Figure 1:
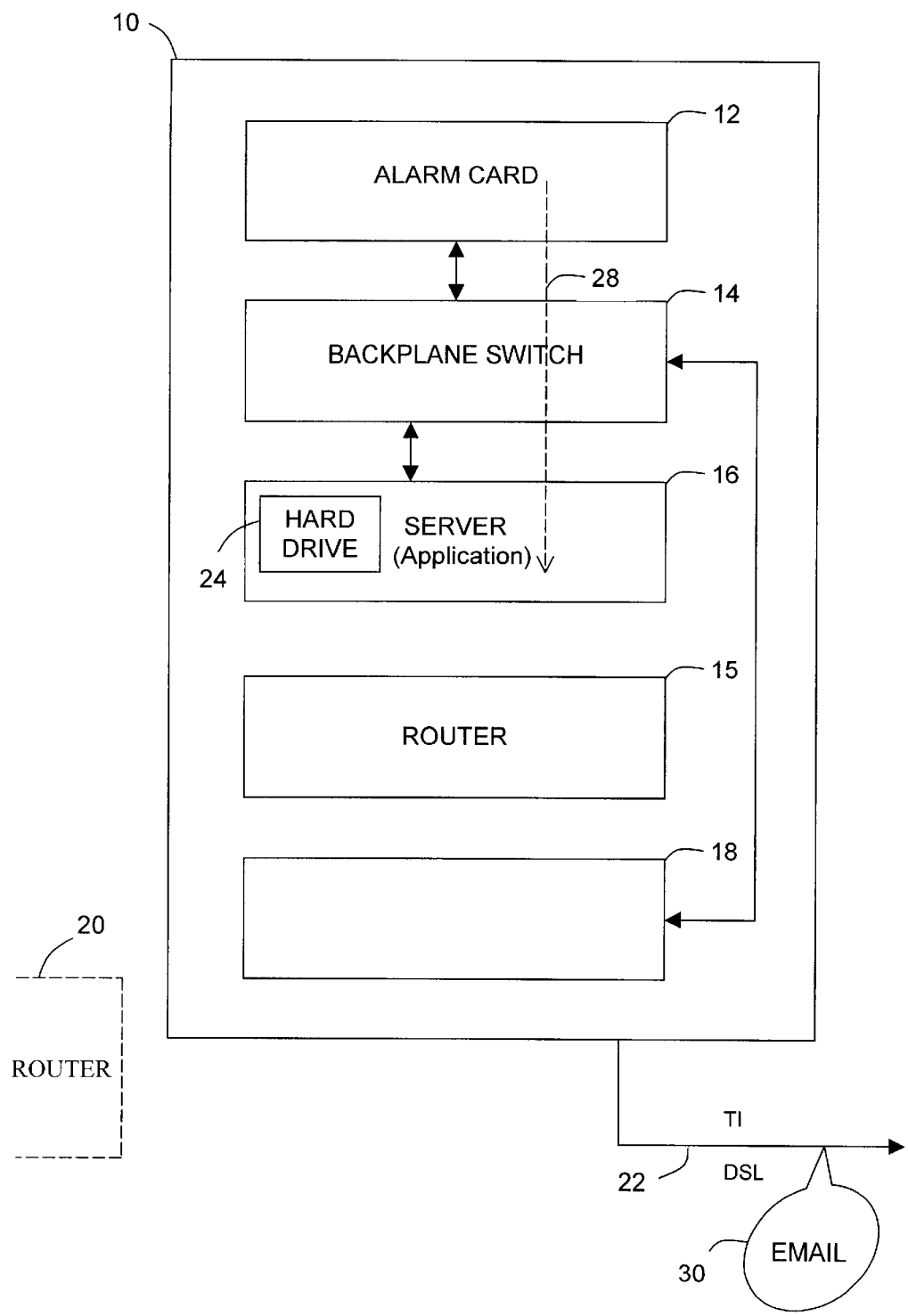
FIG. 1 shows a networking equipment 10 is shown in accordance with an embodiment of the present invention.

Referring now to FIG. 1, a networking equipment 10 is shown in accordance with an embodiment of the present invention. The networking equipment 10 is shown to include an alarm card 12, a backplane switch 14, a server card 16 and other cards 18. The networking equipment 10 receive and transmits digital information, generally in the form of packets, through an interface 22, which in one embodiment of the present invention is a wide area network (WAN) interface for coupling information to and from a packet switching network (not shown in FIG. 1). In various embodiments of the present invention, the interface 22 is a T1 line or DSL or any other known types of interface used for coupling to a packet switching network.

In one embodiment of the present invention, networking equipment 10 includes a router device 15 for selecting a path for data transmitted through the packet switching network to travel. The router 15 is coupled to the interface 22. The other cards 18 in the networking equipment 10 may be additional router devices, servers or circuitry for performing other types of networking functions. Other than networking functions, various devices are included in the networking equipment and not shown in FIG. 1 but these devices will be discussed in further detail with respect to other figures included herein. In another embodiment of the present invention, the router device is located externally to the networking equipment 10, as shown by the location of the router device 20 in FIG. 1.

The cards within the networking equipment 10 are coupled to one another through the backplane switch 14 and report problems and/or failures experienced thereby to the alarm card 12, through the backplane switch 14. While not shown in FIG. 1, other devices, such as power supplies, a fan and the like are included within the networking equipment 10, which are shown and discussed with respect to other figures.

The server card 16 includes various components that are present in a personal computer (PC), such as a CPU and hard drive. The CPU executes various application programs through an operating system, such as Windows. An example of an application program is the system manager software, which is used for maintaining the status of the various components within the networking equipment 10 in the form of failures or problems experienced by the various components (or Field Replaceable Units (FRUs)). In one embodiment of the present invention, the alarm card 12 monitors the status of the components and reports the status to the system manager software, which is executed in the background during the operation of the networking equipment 10. One embodiment of the networking equipment 10 is the Integrated Communications Solution (ICS)7750 product manufactured by Cisco Systems, Inc. of San Jose, Calif.

Failures within any of the components of the networking equipment 10 are detected by performing an error detection function continuously and automatically in the background thereby remaining transparent to the users of the networking equipment. The error detection function is performed by the execution of software although the same may be accomplished in hardware. Upon the detection of a problem, if the problem is one which was intended to be monitored, is reported to a field availability monitoring system (FAMS), in the form of an email message or other file transfer methods, through the interface connection 22. An example of such a problem is the failure of a fan (not shown to be included in the networking equipment 10 but shown relative to other figures herein). In this example, the fan is monitored by the alarm card 12. The alarm card 12 reports the problem at 28 to the system manager software. The problem is then transmitted, in the form of an email message 30 or other forms of message transfer methods, through the interface Connection 22, to FAMS (not shown in FIG. 1) after being packetized by the router.

In the case where a failure experienced by any of the components being monitored (FRUs) within the networking equipment 10 adversely effects the ability of the networking equipment 10 to send an email, the email message is preserved and transmitted upon resolution of the failure or at such a time as when the ability of the transmission of email messages is resumed. An example of such a failure is the connection 22 being faulty or disconnected to the packet switching network. In the case where the problem is a hardware problem, no email message is sent until the problematic hardware or the structure in which the problematic hardware resides is replaced and subsequently an email message is transmitted to report the failure. It is important to report the failure even after the problem is cured, particularly in certain situations, as will become apparent shortly. For now, suffice it to state that the problem needs to be accounted therefore in order to track the performance of a particular component for the ability to eliminate frequently-faulty devices thereby improving the overall reliability of the networking equipment 10. In this manner at least two types of information become available regarding the networking equipment, These are reliability information and characterization of the failures experienced by the networking equipment. For example, common causes of failures, such as disconnection of the connection 22, fan failure and the like, are identified.

Figure 2:
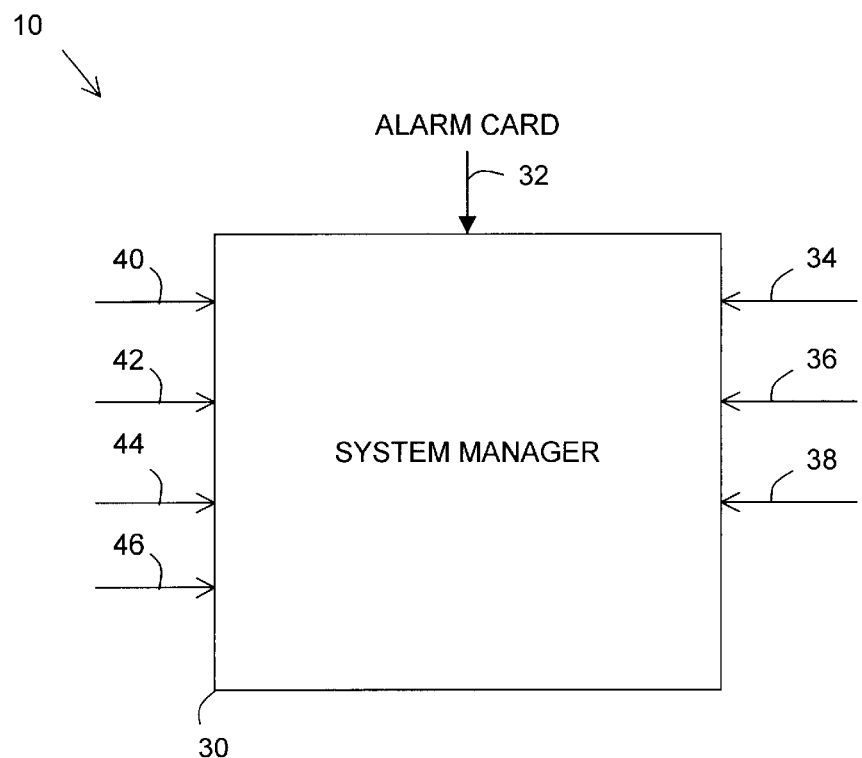
FIG. 2 shows reporting from various components within the networking equipment 10 to the system management software 30.

FIG. 2 is intended to show reporting from various components within the networking equipment 10 to the system management software 30. As earlier stated, the alarm card monitors the various components within the networking equipment 10 and reports the same to the system management software 30. However, other components are also directly monitored by the system management software 30 and reports of any of their failures are made to the latter. This is shown by pointers 34–46, which are intended to represent reporting from various components of the networking equipment 10 directly into the software monitoring software 30. Upon receiving a failure or problem experienced by one or more of the components being monitored, the monitoring software 30 then causes the generation of an email message and transmission of the same though the router to the FAMS.

Figure 3:
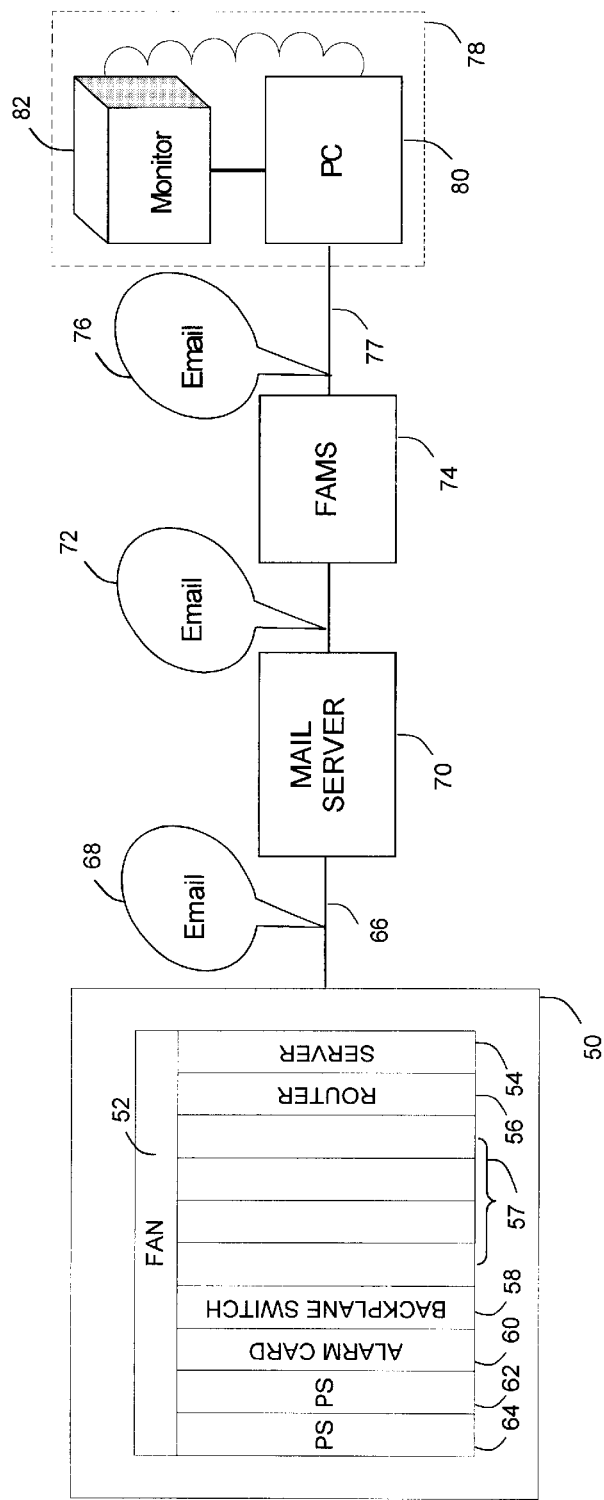
FIG. 3 shows a networking equipment 50 in accordance with another embodiment of the present invention.

In FIG. 3, in one embodiment of the present invention, a networking equipment 50 is shown coupled to a mail server 76, which is coupled to a FAMS 74, which is coupled to a user system 78. The networking equipment 50 is shown to include a fan 52, a server 54, a router 56, a backplane switch 58, an alarm card 60, a power supply, 62 and a power supply 64. Other devices or components 57 may be included within the networking equipment 50. The components just numerated within the networking equipment 50 are coupled together through the backplane switch 58. The server 54, the router 56 and the alarm card 60 perform the functions discussed with respect to FIG. 1. The power supplies 62 and 64 provide power to the various components 54–60 within the networking equipment 50. The fan 52 is used for cooling the components within the networking equipment 50.

As earlier discussed, the system management software resides within the server 54 and functions to send an email message 68 to the mail server 70 upon detection of a problem with one or more of the components of the networking equipment 50. The networking equipment 50 is coupled to the mail server 70 through an interface connection 66, which as previously discussed, is a WAN interface in one embodiment of the present invention. The email message 68 is thus coupled onto the interface connection 66 between the networking equipment 50 and the mail server 70. The networking equipment 50 is typically located remotely to the server 70. The email message 68 is stored within the mail server 70 and subsequently transmitted, as email message 72 to the FAMS 74. In one embodiment of the present invention, FAMS is included in a server.

FAMS 74 performs certain functions upon receipt of the email message 72, which will be discussed in further detail with respect to subsequent figures. Briefly, FAMS 74 includes a database and converts the contents of the email message 72 to fields for identifying information regarding components under surveillance. Upon receipt of an initial email after the networking equipment 50 is shipped to a customer or user thereof and becomes operational, FAMS determines whether or not to accept the contents of the email message and if a positive determination is made to this effect, FAMS logs the time and initializes an account for tracking the particular component(s) sought to be monitored.

FAMS 74 then sends an email message 76 to the user system 78 for viewing and/or analysis. In one embodiment of the present invention, the user system includes a personal computer 80 coupled to a monitor 82. The personal computer 80 receives the email message 76 from the FAMS 74, through a connection 77, which may be an Ethernet connection and views the history of failures experienced by components of the networking equipment 50, as gathered by FAMS 74. For example, a graph or other types of charts can be generated from the information gathered by FAMS and viewed, using a web browser, on the monitor 82. The viewed information may be used for assessing the quality of various parts and for identifying common problems associated with particular components allowing improvement of system performance by the elimination of frequently faulty components.

Figure 4:
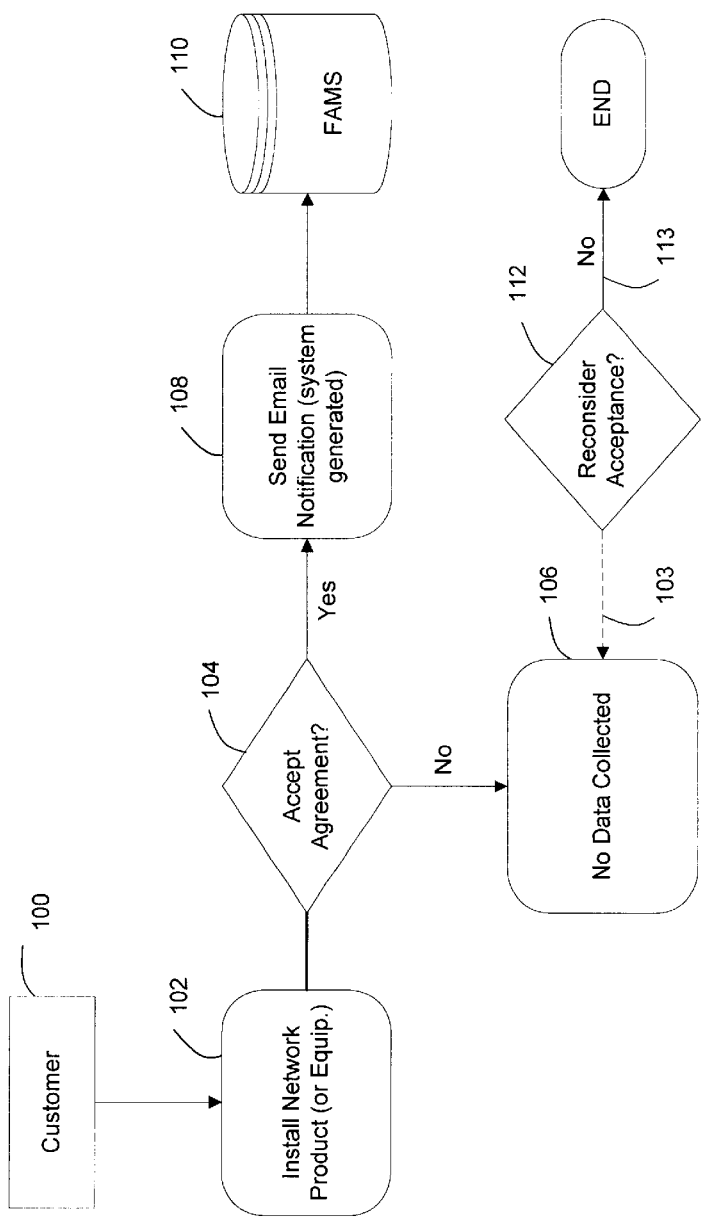
FIG. 4 shows steps performed when a networking equipment is first installed by a user of the same in accordance with an embodiment of the present invention.

FIG. 4 shows steps performed when a networking equipment is first installed by a user of the same in accordance with an embodiment of the present invention. At 100, the customer or user of the networking equipment receives the latter and at 102, the networking equipment is installed. Upon installation, the customer is presented with a data collection agreement and asked to accept or reject the same. The agreement is regarding acceptance from the customer to allow performance information to the manufacturer of the networking equipment. An example of such an agreement where Cisco Systems, Inc. is the manufacturer of the networking equipment is as follows:.

Please Read and Either Accept or Reject.

Cisco would like to receive information on the performance of its products out in the field. This product has a built in routine that can send performance information to Cisco Quality whenever an event that affects availability or reliability occurs. You are not required to enable this feature; you may reject it for any reason.

Cisco will obtain availability information to monitor the performance of your system in order to understand the product performance in customer environments. This will enable us to improve the hardware and software performance of our products and is a key part of Cisco's ongoing commitment to the improvement of your network. This information will not be used for any purpose other than the performance evaluation of Cisco products.

If you choose to accept this option now, you may easily change your selection at any time in the future by going to the preferences menu and selecting settings. If you would like more information on this feature, please visit www.cisco.com/fams/docs/availability.

I want reliability and availability information regarding my system to be automatically sent to Cisco via email on an ongoing basis:

__Yes

__No

At 104, in FIG. 4, the customer is asked to accept or reject the agreement. If the customer, decides to accept the agreement and does so, the networking equipment will send an email at 108 to FAMS 110, where a new record is generated for that particular networking equipment. This initial email message is not the same as an email message regarding the reliability of the component of the networking equipment but is formatted similarly to the email message sent for reliability information. A template of an email message is presented hereinbelow. The acceptance email is identified by a syslog message that will read: "init". An example of the format of an availability email message is as follows:

Sample availability monitoring email message:

Product Name: ICS 7750 Series

MAC Address: 0000.02c5.2d30

Failure Date/Time: 2000/02/28 08:20:14

Revision Number: 1.1a

Slot1: SPE1 0000.0234.2df0

Slot2: SPE2 0000.02b3.3f93

Slot3: MRP1 0000.0236.25a0

Slot4:

Slot5:

Slot6:

Slot7: SSP 0000.0235.6978

Slot8: SAP

PS: (1)

In FIG. 4, if at 104, the customer decides not to accept the agreement, no data is collected at 106. Also, after sending of the email notification at 108, optionally, the customer may be asked to confirm acceptance of the agreement at 112. If acceptance is not confirmed at 113, the process ends and if acceptance is confirmed at 103, the process continues to "no data collected" at 106.

An event that affects the reliability or availability of the networking equipment is communicated through to FAMS. Such reliability or availability information includes: System Boot Up, adding, removing or replacing field replaceable units (FRUs) and a subset of the Fault Management events. An FRU is a unit that is being monitored for availability or reliability. An example of an FRU is the server discussed with respect to FIG. 1.

Figure 5:
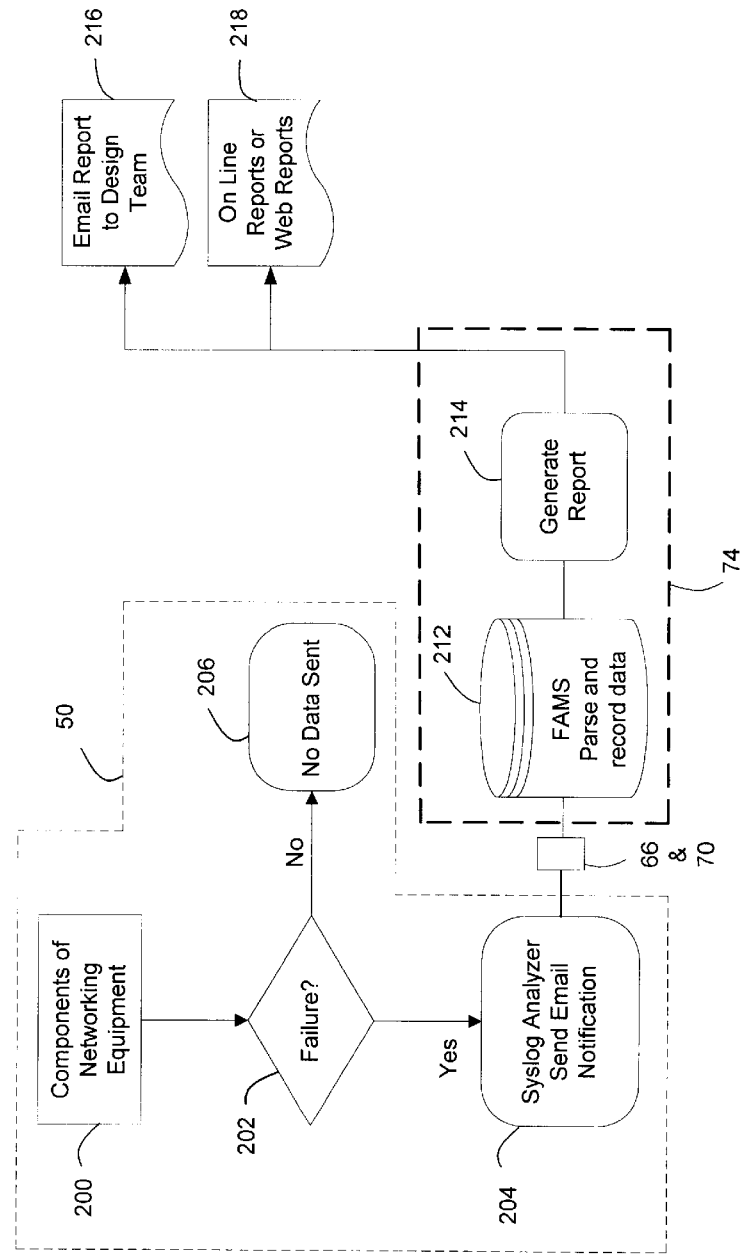
FIG. 5 illustrates a monitoring process in accordance with an embodiment of the present invention.

Once availability monitoring has been approved, as discussed with respect to FIG. 4, the system is set up to monitor the availability and reliability of the components or FRUs of the networking equipment. FIG. 5 shows a monitoring process in accordance with an embodiment of the present invention.

In FIG. 5, the networking equipment 50 is shown to include components that are being monitored at 200. At 202, if a failure is determined to have occurred, an email notification message is sent at 204 regarding the failure. The message is sent, through a packet switching network (interface connection 66 in FIG. 3, such as the Internet, to the email server 70 and stored therein until transmitted to the FAMS server 74. If at 202, it is determined that there is no failure, no data (and thus no email message) is transmitted at 206. The FAMS server 74 parses and records the data in the email message received from the mail server at 212 and generates a report that aggregates all of the data and email at 214, which can be transmitted in the form of an email message at 216 to a design team or can be reported on line or viewed by a web browser at 218. The parsing of the email by the FAMS at 212 involves converting the data within the email to fields recognizable by a database within the FAMS including availability and reliability information associated with components. It should be noted that the steps shown in FIG. 5 to occur within the networking equipment are performed by the system management software.

Figure 6:
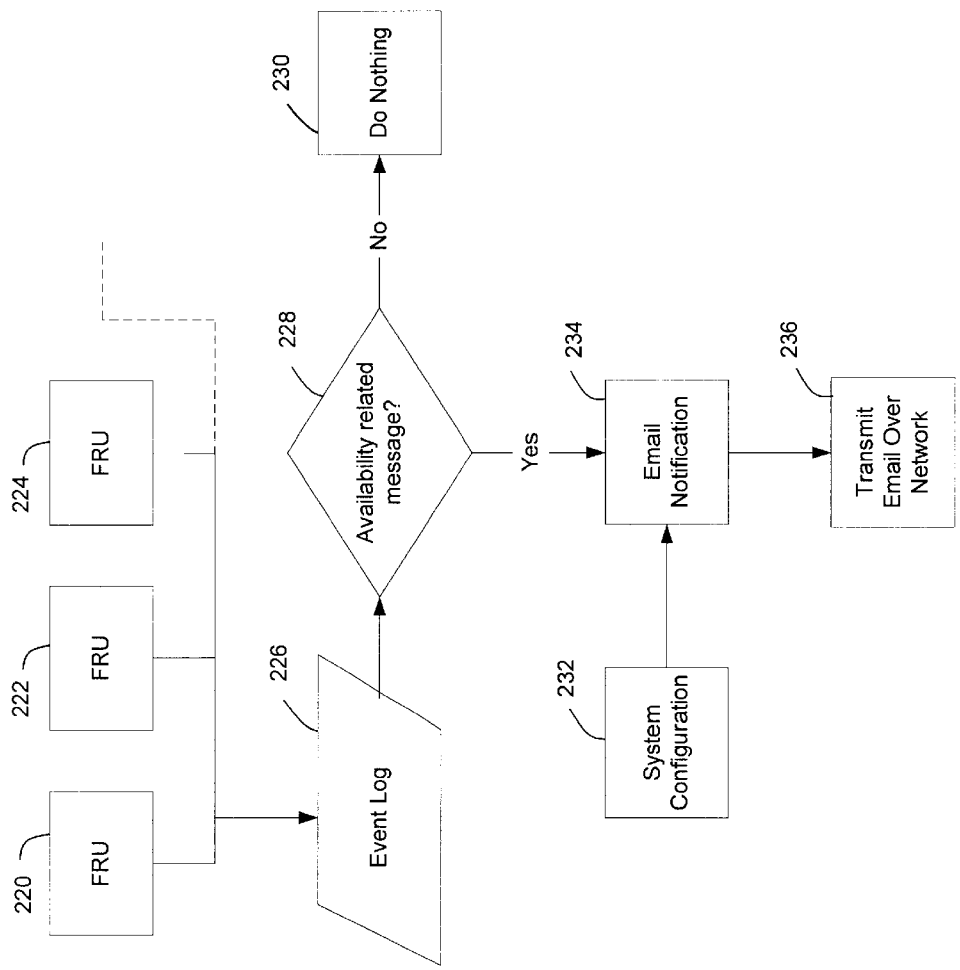
FIG. 6 shows a diagrammatical representation of the steps performed in sending an email message from the networking equipment 10 in FIG. 1 or 50 in FIG. 3.

FIG. 6 shows a diagrammatical representation of the steps performed in sending an email message from the networking equipment 10 in FIG. 1 or 50 in FIG. 3. FRUs 220–224 are shown to be monitored for failure or problems. As should be understood, while three FRUs are shown, any number of FRUs may be monitored. The FRUs report to an event log 226, which logs the messages received from the FRUs. Subsequently, at 228 the event log message is checked and determined as to whether or not it is an availability-related message. If not, no action is taken at 230. If the message is determined to relate to availability, upon configuring the system at 232, an email notification, at 234, message is transmitted. Thereafter, an email message is transmitted over the network at 236.

Figure 7:
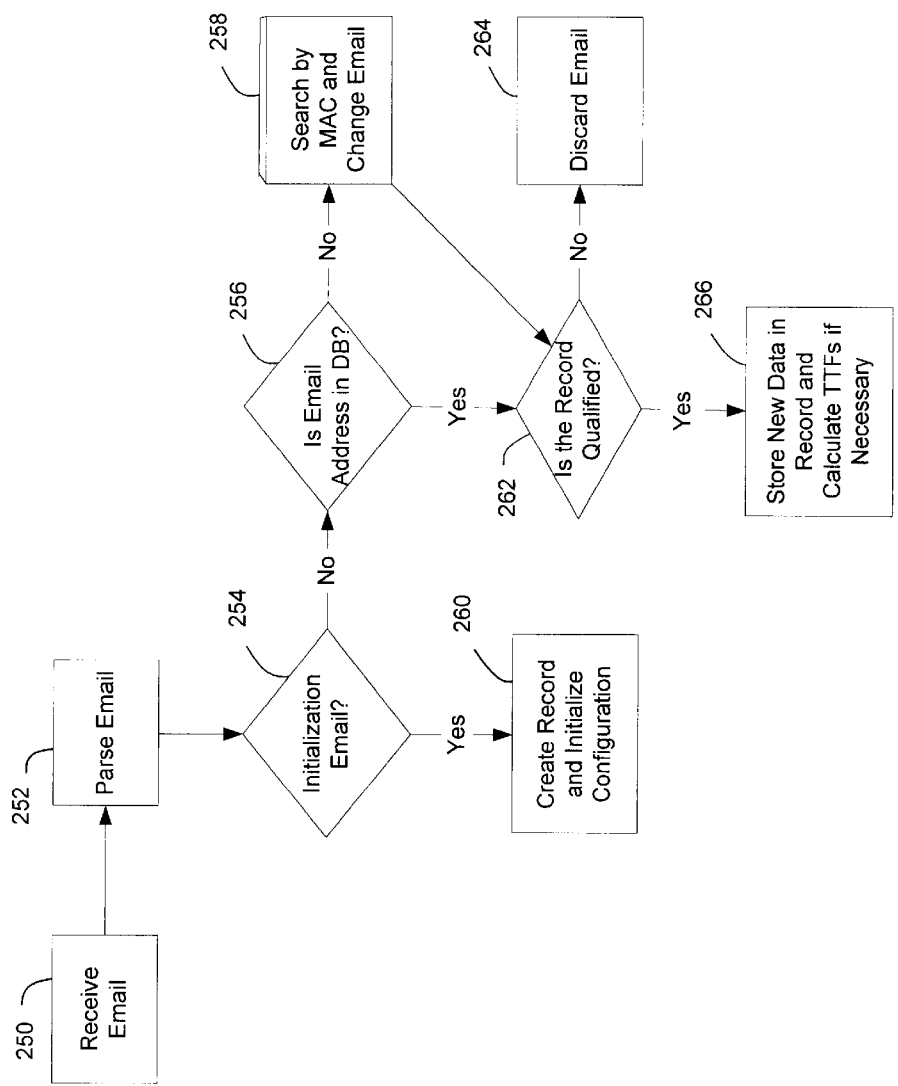
FIG. 7 shows a flow chart of the steps taken by the FAMS server 74 in accordance with an embodiment of the present invention.

FIG. 7 shows a flow chart of the steps taken by the FAMS server 74 in accordance with an embodiment of the present invention. At 250, an email message is received from the networking equipment, through the mail server. At step 252, the received email message is parsed, thereafter, at 254, a determination is made as to whether or not the parsed message is an initalization message. If so, a record is created at 260 and a particular configuration is initalized, that is, FAMS is initialized. If at 254, it is determined that the message is not an initalization message, at 256, a determination is made as to whether or not the address of the parsed email is in the database of FAMS. If not, at step 258, a search is conducted for a unique physical address (such as a Media Access Control number for identifying a particular hardware component) and the email message is changed and the process proceeds to 262 where a determination is made as to whether or not the record is qualified. If at 256, it is determined that the email address is in the database, the process again goes to 262. A disqualified record is a record that is disqualified from the database because it introduces inaccuracies to the data and cannot therefore be accepted, otherwise, a record is qualified and thus accepted.

If at 262, it is determined that the record is not qualified, the email message is discarded at 264 and if it is determined that the record is qualified, at 266, the contents of the parsed email message is stored and Time To Failure (TTF) is calculated if necessary. TTF is calculated only if a failure occurs.

Figure 8:
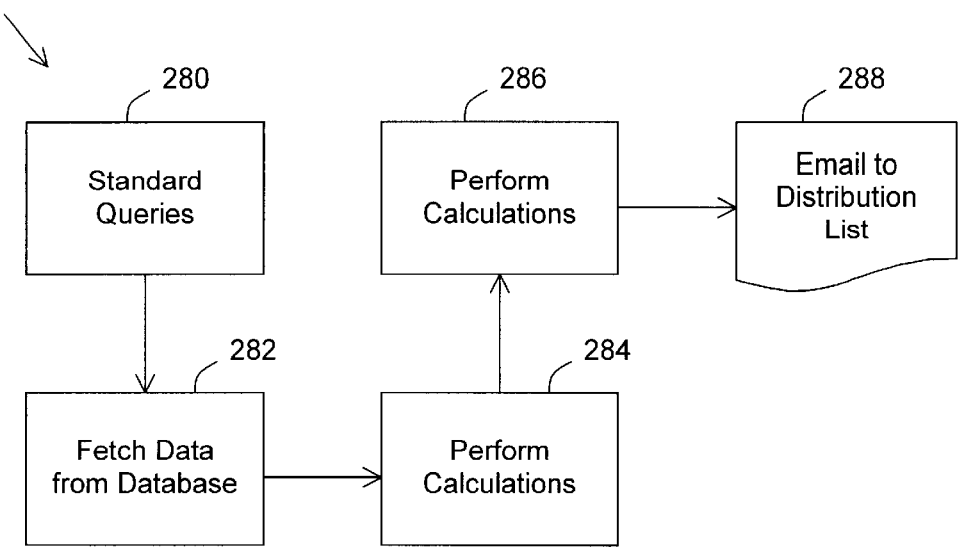
FIG. 8 illustrates a flow chart of the steps performed for sending a monthly email message to verify functionality of the networking equipment in accordance with another embodiment of the present invention.

FIG. 8 shows a flow chart of the steps performed for sending a monthly email message to verify functionality of the networking equipment in accordance with another embodiment of the present invention. That is, optionally, to ensure that the networking equipment is operating properly, an email is generated periodically, such as once a month, to FAMS from the networking equipment for verifying proper functionality. The steps outlined in FIG. 8 are performed by the FAMS server 74.

In FIG. 8, at 280, a standard query or status check is performed of the components or FRUs being monitored. At 282, data is fetched from the database and at 284 calculations are performed on the fetched data. The fetched data represents the history of failures and other FRU related information. Examples of the types of calculations performed on the data are MTBF, which is calculated by dividing the number of failures occurred into the total number of hours all units or components are in operation. Next, at 286, an email message is generated and at 288, the generated email message is transmitted to a predetermined distribution list of email recipients (such as members of the design team of the networking equipment).

Figures 9, 10:
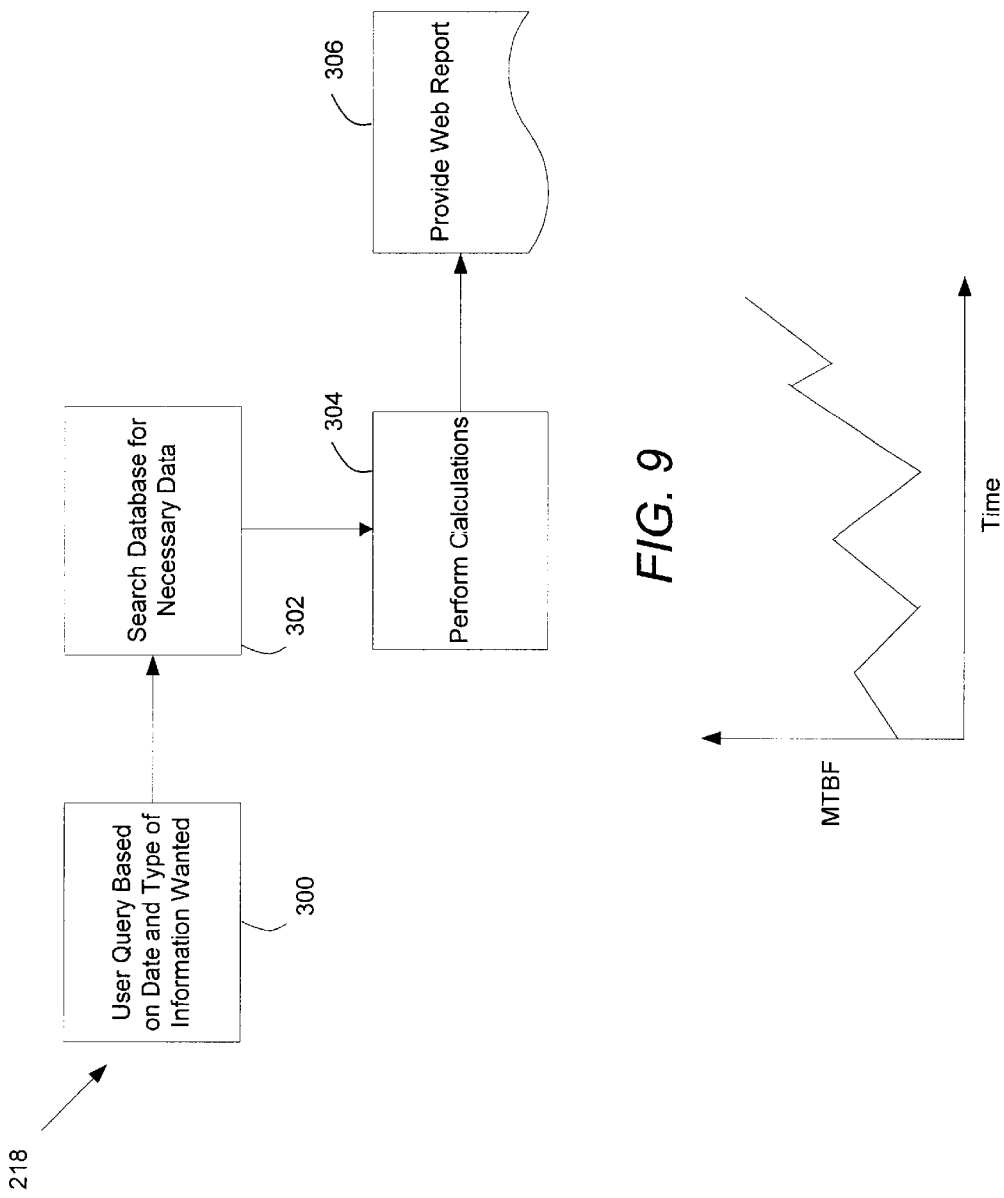
FIG. 9 shows a flow chart of the steps performed in creating a web report, such as the one discussed with respect to 218 in FIG. 5.
FIG. 10 depicts an example of a chart viewed on the monitor 82 (in FIG. 3) and provided as a web report at 306 in FIG. 9.

In FIG. 9, a flow chart is presented of the steps performed in creating a web report, such as the one discussed with respect to 218 in FIG. 5. FAMS performs such steps. At 300, in FIG. 9, the user queries data based on a particular date (or range of dates) and the type of information desired. Next, at 302, a search is performed of the database within FAMS for the queried data. At 304, calculations are performed on the data found in the database. These calculations include MTBF, availability and the like. At 306, a web report is provided.

In FIG. 10, an example of a chart viewed on the monitor 82 (in FIG. 3) and provided as a web report at 306 in FIG. 9 is shown. In this example, the MTBF relating to a particular FRU is shown to change over a particular time period.

In one embodiment of the present invention, the management software is stored in the hard drive 24. In alternative embodiments, the hard drive 24 is nonvolatile memory or other types of storage devices capable of storing information even when power is not provided to the networking equipment 10.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A networking system comprising:
   a field availability monitoring system (FAMS) for receiving problems associated with one or more field replaceable units (FRUs), said FRUs included within a networking equipment, qualifying the problem and transmitting the problem for tracking thereof so as to improve the quality of components used in the FRUs, said networking system further comprising a mail server coupled between the networking equipment and the FAMS for receiving and storing the transmitted problems from the networking equipment.

2. A networking system as recited in claim 1 wherein one of the one or more FRUs is a fan.

3. A networking system as recited in claim 1 wherein one of the one or more FRUs is a router.

4. A networking system as recited in claim 1 wherein one of the one or more FRUs is a switch.

5. A networking system as recited in claim 1 wherein the networking equipment includes a server for storing a system manager for reporting the problems associated with the one or more FRUs, the reported problems, to the FAMS.

6. A networking system as recited in claim 5 further including a router for transmitting the reported problems in the form of an email message.

7. A networking system as recited in claim 6 wherein the FAMS includes a database and further wherein the reported problems of the email message are converted to fields recognizable by the database for identifying information, such as the problems, regarding the FRUs.

8. A networking system as recited in claim 1 wherein the FAMS further for qualifying the reported problems and if qualified, for preparing a reliability report and transmitting the reliability report for display on a web browser.

9. A networking system as recited in claim 1 wherein the FAMS further for qualifying the reported problems and if qualified, for preparing a reliability report and transmitting the reliability report for analysis thereof.

10. A networking system as recited in claim 1 further including an alarm card for receiving the problems associated with the FRUs and transmitting the same to a software manager.

11. A networking system as recited in claim 1 further including a router coupled to the networking equipment for transmitting the problems in the form of an email message.

* * * * *